(12) United States Patent
Jackson

(10) Patent No.: US 10,167,651 B2
(45) Date of Patent: Jan. 1, 2019

(54) POOL WATER FILTRATION SYSTEM

(71) Applicant: Clint Jackson, San Angelo, TX (US)

(72) Inventor: Clint Jackson, San Angelo, TX (US)

(*) Notice: Subject to any disclaimer, the term of this patent is extended or adjusted under 35 U.S.C. 154(b) by 0 days.

(21) Appl. No.: 15/457,484

(22) Filed: Mar. 13, 2017

(65) Prior Publication Data

US 2017/0183885 A1    Jun. 29, 2017

Related U.S. Application Data

(63) Continuation-in-part of application No. 14/121,086, filed on Sep. 8, 2014, now abandoned.

(51) Int. Cl.
| | | |
|---|---|---|
| *E04H 4/16* | (2006.01) | |
| *B01D 29/66* | (2006.01) | |
| *E04H 4/12* | (2006.01) | |
| *B01D 35/02* | (2006.01) | |
| *C02F 1/00* | (2006.01) | |
| *C02F 103/42* | (2006.01) | |

(52) U.S. Cl.
CPC ........... *E04H 4/1681* (2013.01); *B01D 29/66* (2013.01); *B01D 35/02* (2013.01); *C02F 1/001* (2013.01); *E04H 4/1218* (2013.01); *C02F 2103/42* (2013.01); *E04H 4/1245* (2013.01)

(58) Field of Classification Search
CPC ....... E04H 4/16; E04H 4/1245; E04H 4/1681; E04H 4/1218; B01D 29/66; B01D 35/26; C02F 1/004; C02F 2301/046; C02F 2101/30; C02F 2103/42; C02F 2303/16
USPC ... 210/167.1, 167.12, 167.16, 167.17, 416.1, 210/416.2, 459, 460
See application file for complete search history.

(56) References Cited

U.S. PATENT DOCUMENTS

| | | | |
|---|---|---|---|
| 3,776,464 A | 12/1973 | Proffit | |
| 3,947,362 A * | 3/1976 | Etani | B01D 29/111 |
| | | | 210/416.2 |
| 4,994,177 A | 2/1991 | Bogar, Jr. | |
| 5,744,406 A * | 4/1998 | Novak | B01J 20/28023 |
| | | | 210/693 |
| 5,885,452 A | 3/1999 | Koteskey | |
| 6,444,120 B1 | 9/2002 | Morgan | |

(Continued)

OTHER PUBLICATIONS

Non-Final Office Action from U.S. Patent and Trademark Office dated Dec. 12, 2016 from corresponding U.S. Appl. No. 14/121,086.

(Continued)

*Primary Examiner* — Fred Prince
(74) *Attorney, Agent, or Firm* — Law Office of Jeff Williams; J. Oliver Williams

(57) ABSTRACT

A system and method for filtering pool water by removing algae from the water without the use of chemicals is presented. The system includes a pump, a hose, and a filter. The pump is configured to move a volume of water from the pool and push the water through the hose. A container is in communication with the hose to receive the water. The container includes an internal filter and a series of holes in the body of the container. The water passes through the filter and is discharged out through the holes. The water is recycled through the filter continuously. The location of the pump and the container relative to one another within the pool allows an operator to dictate the level of circulation and filtration of water through the pool.

20 Claims, 3 Drawing Sheets

(56) References Cited

U.S. PATENT DOCUMENTS

| | | |
|---|---|---|
| 6,942,790 B1 | 9/2005 | Dolton |
| 7,537,691 B2 | 5/2009 | Reid |
| 2004/0182765 A1 | 9/2004 | Mauro, Sr. |
| 2005/0279683 A1* | 12/2005 | Erlich .................. E04H 4/1636 210/167.16 |
| 2007/0007192 A1 | 1/2007 | Reid |
| 2008/0250581 A1 | 10/2008 | Henkin |

OTHER PUBLICATIONS

Final Office Action from U.S. Patent and Trademark Office dated Mar. 30, 2016 from corresponding U.S. Appl. No. 14/121,086.
Non-Final Office Action from U.S. Patent and Trademark Office dated Nov. 19, 2015 from corresponding U.S. Appl. No. 14/121,086.

* cited by examiner

POOL WATER FILTRATION SYSTEM

CLAIM OF PRIORITY

This application claims the benefit of U.S. patent application Ser. No. 14/121,086, filed 8 Sep. 2014. The information contained therein is hereby incorporated by reference.

BACKGROUND

1. Field of the Invention

The present application relates to a filtration device, and more particularly to a portable filtration system used to accelerate the processing and removal of algae from a swimming pool.

2. Description of Related Art

Pools are common in the United States, especially in warmer climates. Pools require a set level of maintenance to maintain clean and clear water. The exact type of maintenance can depend on the type of cleaning system used. The basic system uses a large pool pump to draw in a volume of water and pass it through a filtration medium. The water is then passed back into the pool. The pool includes a set of inlet ports (skimmers) where the water is drawn from. Additionally, there are a plurality of outlet ports for the return of the water. The idea is that the location of the ports and the sizing of the pool pump is ascertained so as to permit the filtering of the entire pool. The filters used in conjunction with the pool pumps can be of various types but each has a life expectancy before needed to be replaced. Factors such as the cleanliness of the pool and the total volume of water processed directly affect the frequency of filter cleaning and replacement.

In conventional pools there are 2 basic elements to pool chemistry: water balance and sanitation. A series of chemicals need to be periodically tested, including: pH Level, Alkalinity Level, Calcium Hardness Level, and so forth. A proper pH Level can be 7.4 to 7.6. A proper Alkalinity Level may be between 100 to 150 ppm (parts per million). A proper Calcium Hardness Level may be between 200 to 275 ppm (parts per million) for plaster pools. Naturally the type of pool and cleaning equipment used can vary the type of chemicals tested for and the frequency of tests. Other factors that come into play are the temperature and location of the pool. Hot days can quickly use up chemicals added to the pool to maintain a proper set of levels. Trained professionals and experienced home owners are typically able to properly maintain a pool with appropriate effort.

However, it is not uncommon for pool chemical levels quickly going out of balance for various reasons. As the pool levels are unbalanced, algae can quickly grow and consume a pool. Some reasons may be failure to properly maintain a pool and equipment failure (i.e. a pool pump). Typically harsh chemicals are added to pools to treat algae breakouts. This requires the pool pump to run constantly for at least a 24 hour period and comes with a warning not to enter the pool for a predetermined time frame. Energy costs associated with running the pump increase as well. Where equipment failure was the cause, treatment is unable to proceed until the repairs are performed. Repairs can be costly and take a number of days to finish. In the meantime, the algae problems continue to worsen resulting in greater cost and difficulty in overcoming it.

Although strides have been made to simplify the maintenance of pools, considerable shortcomings remain. A new system is needed that can serve to temporarily filter pool water and remove algae. The system needs to be portable, less costly to run than a pool pump, and can remove algae from a pool irrespective of the operability of pool equipment so as to allow quick treatment. Ideally the system should work without the need of harsh chemicals.

SUMMARY OF THE INVENTION

An object of the present application to describe a portable water filtration system completely detached from existing pool maintenance equipment that is configured to permit the chemical-free treatment and filtration of pool water so as to remove algae from the pool. The system includes a pump for obtaining and pumping the pool water through a hose to a container. The container has a filter and a plurality of apertures/holes for permitting the passage and discharge of pool water. The system is selectively placed within the pool and configured to circulate and filter the pool water.

It is an object of the present system to permit for the visual inspection of the filter within the container to ascertain the condition of the filter. The container is permitted to remain submerged in the pool during inspection. The system is permitted to continue operation during inspection.

It is a further object of the present system to selectively dictate the type of circulation occurring in the pool during filtration. The pool water is pulled in through an inlet in the pump and moved over to the container where it is discharged. Water is continuously fed through the pump and the container. By varying the location of the inlet and the container, a user is able to affect the type of circulation occurring in the pool. Locating the inlet adjacent to the container minimizes circulation and provides localized treatment of the pool water. Localized treatment can result in faster algae filtration and reduced costs. Locating the inlet distal from the container increases circulation throughout the pool and provides generalized treatment.

Another object of the present application is to minimize the costs associated with continuous filtering of pool water through conventional treatment methods. Additionally, the system is operable with or without the operation of the standard pool equipment. The system is therefore simple to begin and treat while pool equipment is inoperable. The system also avoids excess wear and tear to existing pool equipment.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
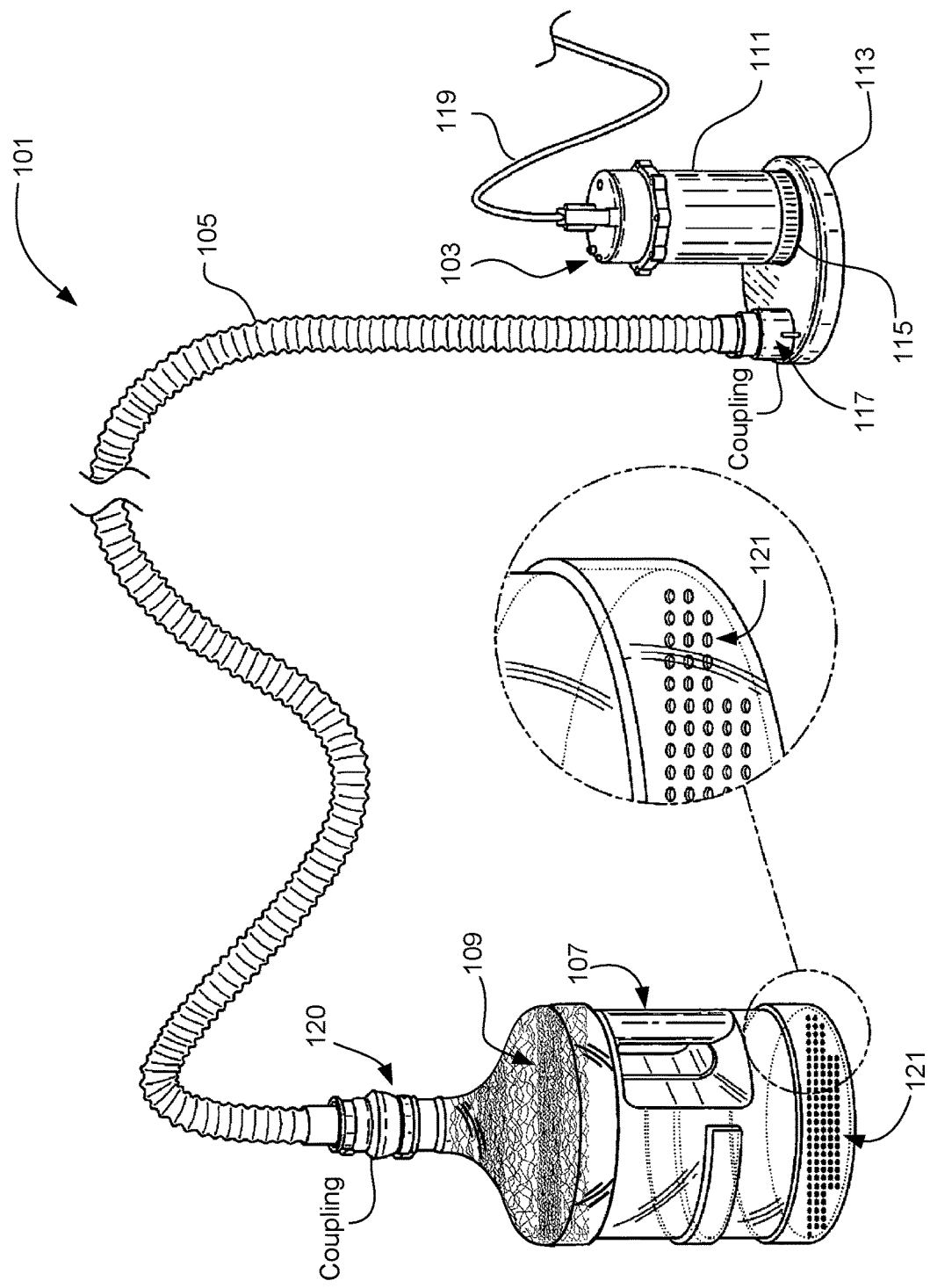
FIG. 1 is a perspective view of a water filtration system according to an embodiment of the present application.

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

The system and method in accordance with the present application overcomes one or more of the above-discussed problems commonly associated with the treatment of pools from the growth of algae. In particular, the system is configured to either process pool water so as to remove algae. The system may be used as a supplement to existing operable pool filtration equipment so as to speed up the filtration of algae. Additionally, the system can operate without functioning pool equipment and act to be the sole filtration device to remove algae. The system does not need to use chemicals. The system is portable and can provide either localized or general filtration treatments. Another advantage of the present system is that the cost to operate it is considerable less than typical pool pumps. By using the system of the present application, the strain on existing systems is minimized and the life expectancy of such systems is not diminished. These and other unique features of the device are discussed below and illustrated in the accompanying drawings.

The device and method will be understood, both as to its structure and operation, from the accompanying drawings, taken in conjunction with the accompanying description. Several embodiments of the device may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

Referring now to the drawings wherein like reference characters identify corresponding or similar elements in form and function throughout the several views. The device and method of the present application is illustrated in the associated drawings. Referring now to FIG. 1 in the drawings, a perspective view of a pool water filtration system is illustrated. System 101 includes a pump 103, a hose 105, and a container 107. Pump 103 is configured to move a volume of water from within the pool and pass that volume of water through hose 105. Hose 105 is in communication with pump 103 and container 107 and is configured to direct the volume of water being moved by pump 103 to container 107. The water enters container 107 and passes through a filter 109 configured to remove algae from the water. The water then discharges through one or more holes back into the pool volume where it is eventually recycled back through system 101.

Pump 103 is configured to pull a volume of water from a pool and pass it through container 107 for filtering. Pump 103 includes a pump housing 111 a base portion 113, and an inlet 115. Pump 103 may be located adjacent to the pool as long as pump 103 is in communication with the water of the pool. For example, pump 103 may be at least partially submerged in the pool, or alternatively located outside of the pool but wherein inlet 115 is in communication with the pool water. In either location, pump 103 and system 101 in general is configured to provide a continuous loop of moving water wherein the water is drawn in from the pool and discharged into the pool in a submerged location. The water is not exposed to the ambient air during filtration. Filtration occurs in a fully submerged and saturated filter.

Housing 111 is located on base portion 113. Portion 113 provides stability for housing 111 and also serves to connect inlet 115 to an outlet 117. Portion 113 may be rested on a pool step or along the coping of the pool. When inlet 115 is not submerged itself, one or more hoses may be used to provide access to the pool water. A motor is included for generating the work required to move the water. An example of a suitable motor is a ⅓ horsepower water submersible pump. As depicted, pump 103 is powered through a plug 119 to ensure constant uninterrupted supply of power. It is understood that power may also be provided through stored power supplies (i.e. batteries) in selected embodiments.

Hose 105 is configured to route the pressurized pool water from pump 103 to container 107. Hose 105 is flexible in nature and can be formed to any length. Hose is coupled to outlet 117 and a portion of container 107. Couplings may be used for generating a water tight seal. One or more reducers may also be used at the fittings to adjust hose 105 to the size of outlet 117 and container 107 openings. An exemplary coupling is a rubber coupling reducing from 2" to 1.5". Fasteners are used to ensure proper seal. It is understood that hose 105 may or may not be fully submerged in the pool water, as the particular routing is dependent upon the locations of pump 103 and container 107.

Container 107 is a hollow housing having an inlet port 120 at one end and one or more holes 121 at an end opposite the inlet port 120. Filter 109 is located between inlet 120 and holes 121. The housing of container 107 is configured to be water tight to prevent leakage or loss of water between inlet 120 and holes 121. Filter 109 is compressed into container 107 so as to consume the interior volume. As seen in FIG.

1, filter 109 is only depicted in a portion of container 107. This is done for clarity purposes so as to allow depiction of container 107 and holes 121 in better quality. It is understood that filter 109 may consume the full interior of container 107.

Figure 2:
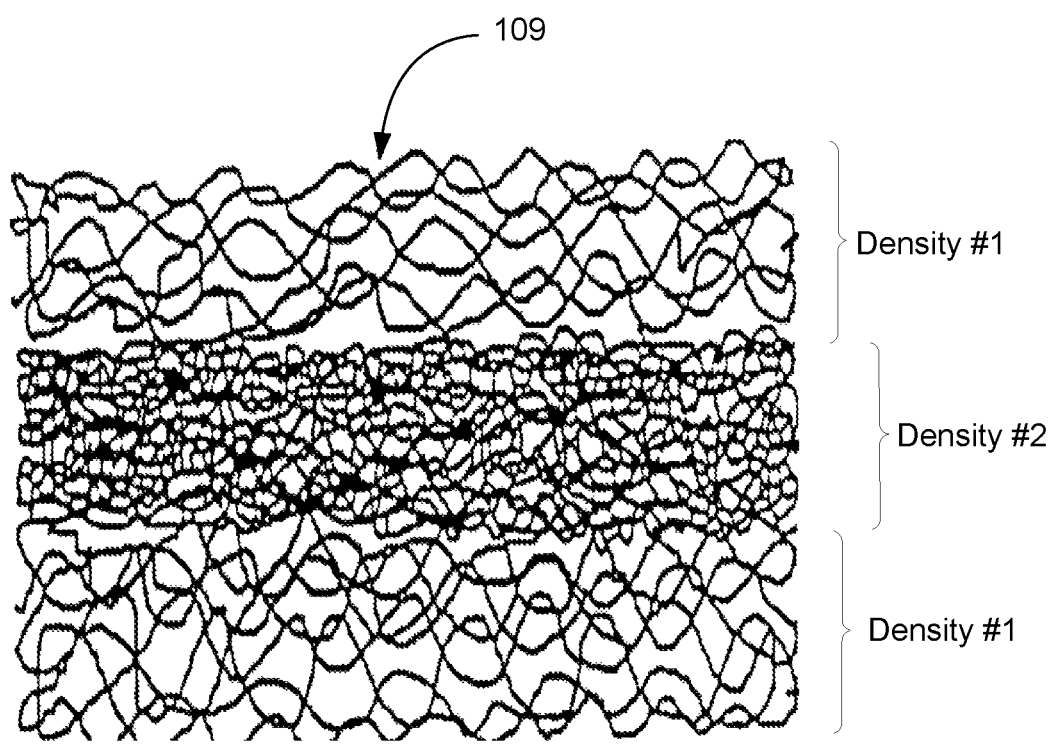
FIG. 2 is an enlarged side view of a filter used in the water filtration system of FIG. 1.

Referring now also to FIG. 2 in the drawings, an enlarged side view of filter 109 is illustrated. Filter 109 is porous in nature to allow water to pass through and be discharged. Naturally the inclusion of a pump and the slight obstruction of a filter causes a slight pressure build-up of fluid in container 103. Subjecting the filtering process to a level of increased pressure (i.e. above ambient pressure) helps to push the water through filter 109 and out holes 121. Filter 109 permits many excellent features. Filter 109 is configured to collect or separate algae from the water. The algae is captured and collected within the fibers of the filter. Filter 109 is a poly-fiber material although other types are considered within the scope of the present application.

Filter 109 is configured to be compressed which can result in varied densities within container 107. The ability to vary the density of the filter within container 107 allows an operator to regulate the level of filtration. Filter 109 may also be cleaned. Cleaning may occur within container 107 or outside after removal. The collected algae may be removed by flushing the filter with clean water (i.e. algae free). The algae releases from the filter. If performed while filter 109 is still in container, the algae flushes out through holes 121. Once clean, the filter may be dried and reused as necessary. Filter 109 may be composed of one or more independent sections of filter material, each of which may have a different density under uncompressed conditions.

A feature of container 107 is the permitted visual inspection of filter 109. Container 107 may include a transparent portion wherein an operator may visually inspect the condition of the filter inside container 107. Algae becomes visible on filter 109 as it is collected. When filter 109 becomes "full" or needs cleaning, the operator may elect to flush water through filter 109 at a higher flow rate than experienced during normal operation. The higher flow rate of water is designed to break loose the algae.

Figure 3:
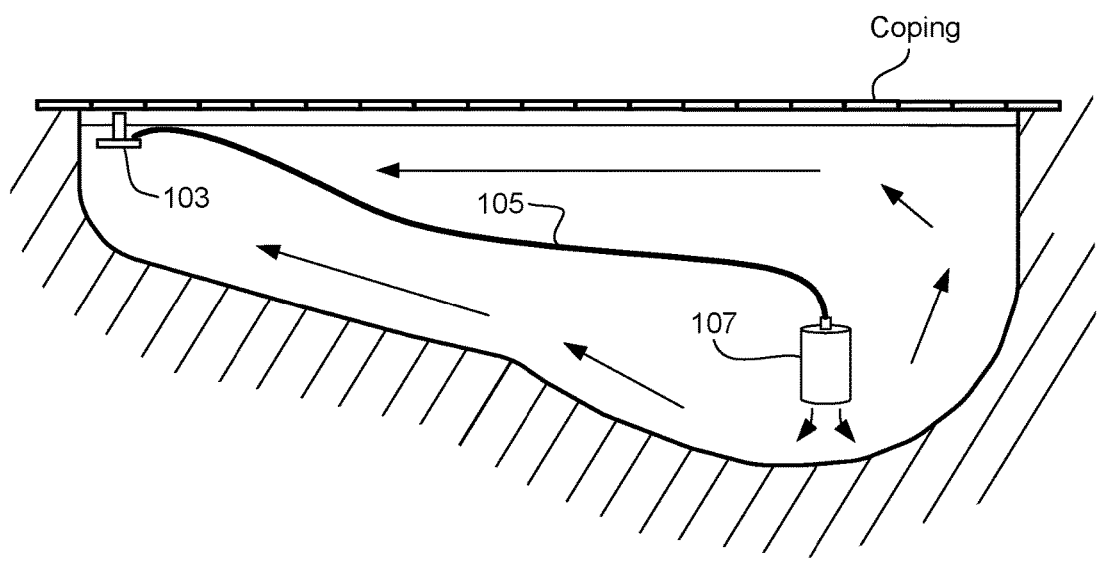
FIG. 3 is a side view of the water filtration system of FIG. 1 in a pool.
Figure 4:
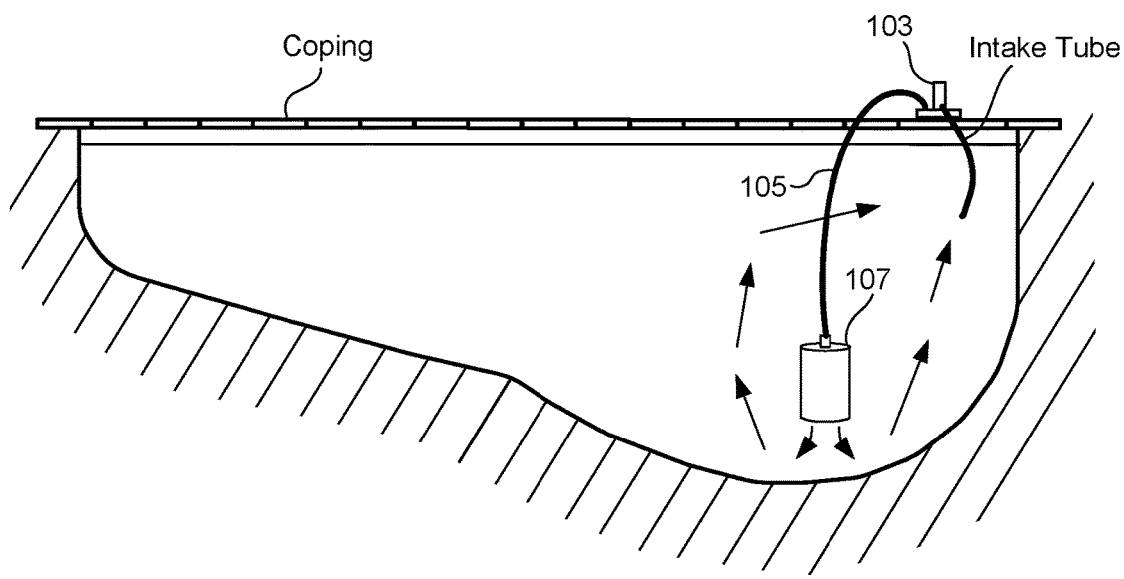
FIG. 4 is an alternative side view of the water filtration system of FIG. 1 in a pool.

In operation, a number of simplistic and powerful advantage of system 101 are illustrated. Referring now also to FIGS. 3 and 4 in the drawings, exemplary side views of a pool are shown with system 101. System 101 is configured to be fully portable and able to be carried by an operator. Each component in system 101 is designed to be relatively light weight. Additionally, system 101 is operable without heavy sand, expensive filtration screens, or the use of chemicals to kill the algae. System 101 is configured to trap the algae and remove the algae from the pool as container 107 is removed.

In the event a pool is experiencing an outbreak of algae or has previously developed algae that is still present, system 101 may be used to capture the algae and permit for its easy removal from the pool. System 101 is operable with or without the use of existing pool equipment. Reasons exist for not operating system 101 with existing pool equipment, such as at least the following: 1) the pool equipment failed and/or is the reason for the algae growth; 2) an owner does not want to put the pool equipment under extra wear and tear; 3) the owner wants to avoid extra costs associated with continuous running of the pool equipment; and 4) the owner desires to use less chemicals.

Once filter 109 is located in container 107, an operator may simply locate pump 103 near the surface of the water and toss in container 107 into the pool. Container 107 is designed to eventually submerge below the surface of the water. System 101 is configured to dictate the level of circulation within the pool. When used, water is pulled through pump 103 and discharged through container 107. A one-directional flow of water is passed through system 101. By selectively locating the areas of intake and discharge, system 101 can influence a circulation of pool water within the pool.

Referring to FIG. 3, system 101 is configured to generate a circulation throughout the entire pool. Location of inlet 115 and container 107 are separated to opposing ends of the pool to increase overall circulation and filtration of the algae within the entire pool. To do so, inlet 115 is located at one end of the pool (i.e. shallow end) and container 107 is located at another end of the pool (i.e. deep end). Ideally, pump 103 is either on the coping where a tube is used to feed inlet 115 or pump 103 is located on a step of the pool to allow for the partial submersion of pump 103 wherein inlet 115 is submerged. This configuration is ideal where algae is seen throughout the entire pool and no real localized concentration is visible.

Referring to FIG. 4, system 101 is configured to provide a more localized circulation in the pool. Conditions may exist in relation to the pool that promote localized growth of algae. For example, conditions may include the depth of the pool and access to shade from the sun. To provide localized treatment, the location of inlet 115 and container 107 are restricted to a singular end of the pool to minimize overall pool circulation and provide localized filtration of the algae within a portion of the pool. In FIG. 4, pump 103 is located on the coping edge of the pool and inlet 115 is aided by a tube in communication with the water.

In use, the method of filtering the pool includes capturing a volume of water from the pool. The water is then passed through a hose to a container. Then filtering of the water through a filter in the container occurs. Once passed through the filter, the water is discharged back into the pool where it is recycled through the system. At any time, an operator may elect to visually inspect the condition of the filter through the container, elect to relocate pump 103 and/or container 107, or elect to flush filter 109 to remove collected algae.

The current application has many advantages over the prior art including at least the following: (1) ability to capture algae from pool water without chemical usage; (2) simple and quick to use; (3) reduced cost to operate; and (4) ability to operate without the use of standard pool equipment.

The particular embodiments disclosed above are illustrative only and are not intended to be exhaustive or to limit the invention to the precise form disclosed, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A portable water filtration system for a pool, comprising:
    a portable pump configured to pull a volume of water from the pool;

a hose in communication with the pump and configured to receive and transport the volume of water being moved; and a rigid portable container in communication with the hose and configured to receive the water being moved, the water being discharged from the pump through the hose and into the portable container, the portable container having an inlet for coupling of the hose, the water passing through the inlet and exiting through an outlet opposite the inlet, the container including:

an internal filter configured to capture algae from the volume of water, the internal filter located adjacent the inlet, the internal filter is compressed within the portable container and contains a plurality of layers with different density; and a plurality of holes defining the outlet and passing through the container such that the volume of water moving through the hose passes through the filter and out through the plurality of holes;

wherein the volume of water is comprised wholly of water from the pool and is recycled through the pump and the container.

2. The system of claim 1, wherein the container is at least partially transparent to permit visual inspection of the condition of the filter.

3. The system of claim 1, wherein the pump is at least partially submerged in the pool.

4. The system of claim 1, wherein the filtration of the water to remove algae is performed without the use of chemicals.

5. The system of claim 1, wherein the volume of water within the container is pressurized as it passes through the filter.

6. The system of claim 1, wherein the pump includes an inlet for the drawing in of the volume of water, the location of the container and the inlet of the pump configured to dictate the level of circulation within the pool.

7. The system of claim 6, wherein the location of the inlet of the pump and the container are restricted to a singular end of the pool to minimize overall pool circulation and provide localized filtration of the algae within a portion of the pool.

8. The system of claim 6, wherein the location of the inlet of the pump and the container are separated to opposing ends of the pool to increase overall circulation and filtration of the algae within the entire pool.

9. The system of claim 1, wherein the filter is made from a poly-fiber material.

10. The system of claim 1, wherein the volume of water remains within the pool during filtration.

11. A method of filtering a pool, comprising:

capturing a volume of water from the pool through a portable pump;

discharging the volume of water from the portable pump through a hose to a rigid container, the container having an inlet for coupling of the hose, the water passing through the inlet and exiting through an outlet opposite the inlet;

filtering the volume of water through a filter in the container, the filter being located adjacent the inlet of the container and having a plurality of layers with different densities, the filter compressed internally within the container, the container and the filter being submerged in the pool;

returning the volume of water from the container into the pool; and recycling the volume of water through the filter, the pump, and the pool.

12. The method of claim 11, further comprising:

visually inspecting the filter through the container, the container being at least partially transparent.

13. The method of claim 11, further comprising:

cleaning the filter by flushing algae-free water through the container.

14. The method of claim 11, wherein the filter is reusable.

15. The method of claim 11, further comprising:

locating the container within the pool, wherein the capturing of the volume of water in the pool is performed by the pump having an inlet in communication with the volume of water.

16. The method of claim 15, wherein the distance between the inlet of the pump and the container can vary, the hose being flexible.

17. The method of claim 15, wherein the location of the container and the inlet of the pump is configured to dictate the level of circulation within the pool.

18. The method of claim 15, further comprising:

locating the inlet of the pump and the container adjacent to one another so as to minimize circulation throughout the pool, the minimized circulation localizes filtration of algae within the pool.

19. The method of claim 15, further comprising:

locating the inlet of the pump and the container distant from one another so as to maximize overall circulation and filtration of algae throughout the pool.

20. The method of claim 11, wherein filtration of the volume of water is performed without the introduction of chemicals.

* * * * *